(12) United States Patent
Gminder

(10) Patent No.: US 12,411,869 B2
(45) Date of Patent: Sep. 9, 2025

(54) DATA PROCESSING INDEPENDENT OF STORAGE, FORMAT OR SCHEMA

(71) Applicant: HITACHI VANTARA LLC, Santa Clara, CA (US)

(72) Inventor: Jacob Russell Gminder, Sanford, FL (US)

(73) Assignee: HITACHI VANTARA LLC, Santa Clara, CA (US)

( * ) Notice: Subject to any disclaimer, the term of this patent is extended or adjusted under 35 U.S.C. 154(b) by 184 days.

(21) Appl. No.: 18/036,198

(22) PCT Filed: Nov. 23, 2020

(86) PCT No.: PCT/US2020/061718
§ 371 (c)(1),
(2) Date: May 10, 2023

(87) PCT Pub. No.: WO2022/108599
PCT Pub. Date: May 27, 2022

(65) Prior Publication Data
US 2023/0418842 A1     Dec. 28, 2023

(51) Int. Cl.
*G06F 16/28* (2019.01)
*G06F 16/2457* (2019.01)
*G06F 16/25* (2019.01)

(52) U.S. Cl.
CPC ...... *G06F 16/285* (2019.01); *G06F 16/24573* (2019.01); *G06F 16/254* (2019.01)

(58) Field of Classification Search
CPC ............. G06F 16/285; G06F 16/24573; G06F 16/254; G06F 16/27
See application file for complete search history.

(56) References Cited

U.S. PATENT DOCUMENTS

| | | |
|---|---|---|
| 2003/0069923 A1 | 4/2003 | Peart |
| 2003/0115454 A1 | 6/2003 | Song |
| 2004/0098397 A1* | 5/2004 | Suzuki ...................... G06F 3/08 |
| 2007/0083522 A1 | 4/2007 | Nord et al. |
| 2007/0198611 A1 | 8/2007 | Prahlad et al. |
| 2009/0210431 A1* | 8/2009 | Marinkovic ........ G06F 16/1827 |
| | | 709/227 |
| 2011/0191522 A1* | 8/2011 | Condict ................ G06F 12/123 |
| | | 711/E12.001 |

(Continued)

OTHER PUBLICATIONS

International Search Report of PCT/US2020/061718 dated Feb. 25, 2021.

*Primary Examiner* — Cam Y T Truong
(74) *Attorney, Agent, or Firm* — MATTINGLY & MALUR, PC

(57) ABSTRACT

In some examples, a computing device is able to communicate with a plurality of data clusters. The computing device may determine a location, format and/or schema of data resource(s) stored in the data clusters upon execution of a process. Metadata may be searched and read to determine the location, format and/or schema of data resource(s) and those data resources may be written to other destinations within the data cluster(s). The locations of the destinations may also be determined at runtime. In some examples, parameters may be configured or specified to drive the execution of one or more operations or processes.

13 Claims, 8 Drawing Sheets

(56) References Cited

U.S. PATENT DOCUMENTS

| | | | |
|---|---|---|---|
| 2011/0265172 A1* | 10/2011 | Sharma | H04L 63/0815 |
| | | | 726/8 |
| 2013/0173546 A1* | 7/2013 | Cline | G06F 16/27 |
| | | | 707/638 |
| 2014/0358935 A1 | 12/2014 | Prahlad et al. | |
| 2019/0312732 A1* | 10/2019 | Hallak | G06F 3/0683 |
| 2021/0117425 A1* | 4/2021 | Rao | H04L 41/0806 |
| 2021/0328793 A1* | 10/2021 | Saravanan | G06F 21/53 |
| 2023/0027188 A1* | 1/2023 | Sridhar | G06F 8/34 |

* cited by examiner

| PARAMETER TYPE | PARAMETER VALUE |
| --- | --- |
| PARAMETER ENABLE FLAG | 1 |
| CATALOG AUTHENTICATION TYPE | 1 |
| CATALOG CLIENT IDENTIFICATION | CATALOG-APP-SERVER-JG |
| CATALOG CLIENT SECRET | 66CB19BL-F3C5 |
| CATALOG AUTHENTICATION TOKEN URL | HTTPS://EXAMPLE.NET/AUTH/TOKEN |
| CATALOG PASSWORD | OKN |
| CATALOG RESOURCE ID | FC23D603C30376FF0ADD5455843BC75 |
| CATALOG URL | HTTPS://CATALOG.MASTER.NET |
| CATALOG USERNAME | ADMIN |
| CATALOG MOVE TARGET DATA SOURCE | CLUSTER 1 |
| CATALOG WRITE FILE FORMAT | CSV |
| CATALOG WRITE NAME | ANALYZE_DATA_08202020.CSV |
| CATALOG WRITE VIRTUAL FOLDER | VFI_30 |
| CATALOG OVERWRITE RESOURCE | FALSE |
| CATALOG PRESERVE FOLDER STRUCTURE | FALSE |

FIG. 2

DATA PROCESSING INDEPENDENT OF STORAGE, FORMAT OR SCHEMA

TECHNICAL FIELD

This disclosure relates to the technical field of ETL processing.

BACKGROUND

ETL (Extract, Transform, Load) processing may typically include extracting data from one or more data sources, sometimes transforming the data in some manner, such as to make the data compatible for an intended use, and loading the data to a target location, such as a data warehouse or other repository. ETL processes are commonly used to gather, consolidate or otherwise integrate data from multiple different data sources, repositories, or the like. Data may also be managed and indexed by a data service, such as a catalog service. Additionally, the catalog service may manage data and metadata associated with the data. However, performing an ETL process with multiple different data clusters and data sources can be challenging. Additionally, interacting with a catalog service to perform ETL processes can be challenging since the interaction with the catalog may require connecting and authenticating to one or more catalogs of the catalog service to perform the ETL process, and the ETL process may require a location, format and/or schema of the data resource contents in order for the data resource to be processed. However, the location, format and/or schema of data resource(s) to be processed may be fixed input to the ETL process. Therefore, if a location, format and/or schema of a data resource to be processed changed, the ETL process logic and and/or steps dependent on that file may have to change to adjust to the change of location, format and/or schema of the data resource. However, changing the ETL process logic is a difficult and cumbersome task. Additionally, a user or client may not know a location, format and/or schema of data resource(s) to be processed changed and therefore would receive errors upon execution of an ETL process that process those files.

SUMMARY

Some implementations include a computing device able to communicate with a plurality of data clusters. For example, a first computing device may be configured to communicate over a network with a plurality of data cluster computing devices associated with a plurality of data clusters storing data resources, and may be configured to manage metadata associated with the stored data resources. The first computing device may execute a single instance of an application to obtain parameters indicating first metadata, and second metadata in a respective data cluster, search the metadata using the first metadata as a search query and return metadata as a first search result. In some cases, the first computing device may also be configured to obtain a first location of one or more data resources in a respective data cluster based on the returned metadata in the first search result, read contents of the one or more data resources from the first location of the respective data cluster, search the metadata using the second metadata as a search query and returning metadata as a second search result, obtain a second location in a respective data cluster based on the returned metadata in the second search result, and write the read contents of the one or more data resources to the obtained second location based on the second search result.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates a data structure of exemplary parameters according to some implementations.

DESCRIPTION OF THE EMBODIMENTS

Figure 1:
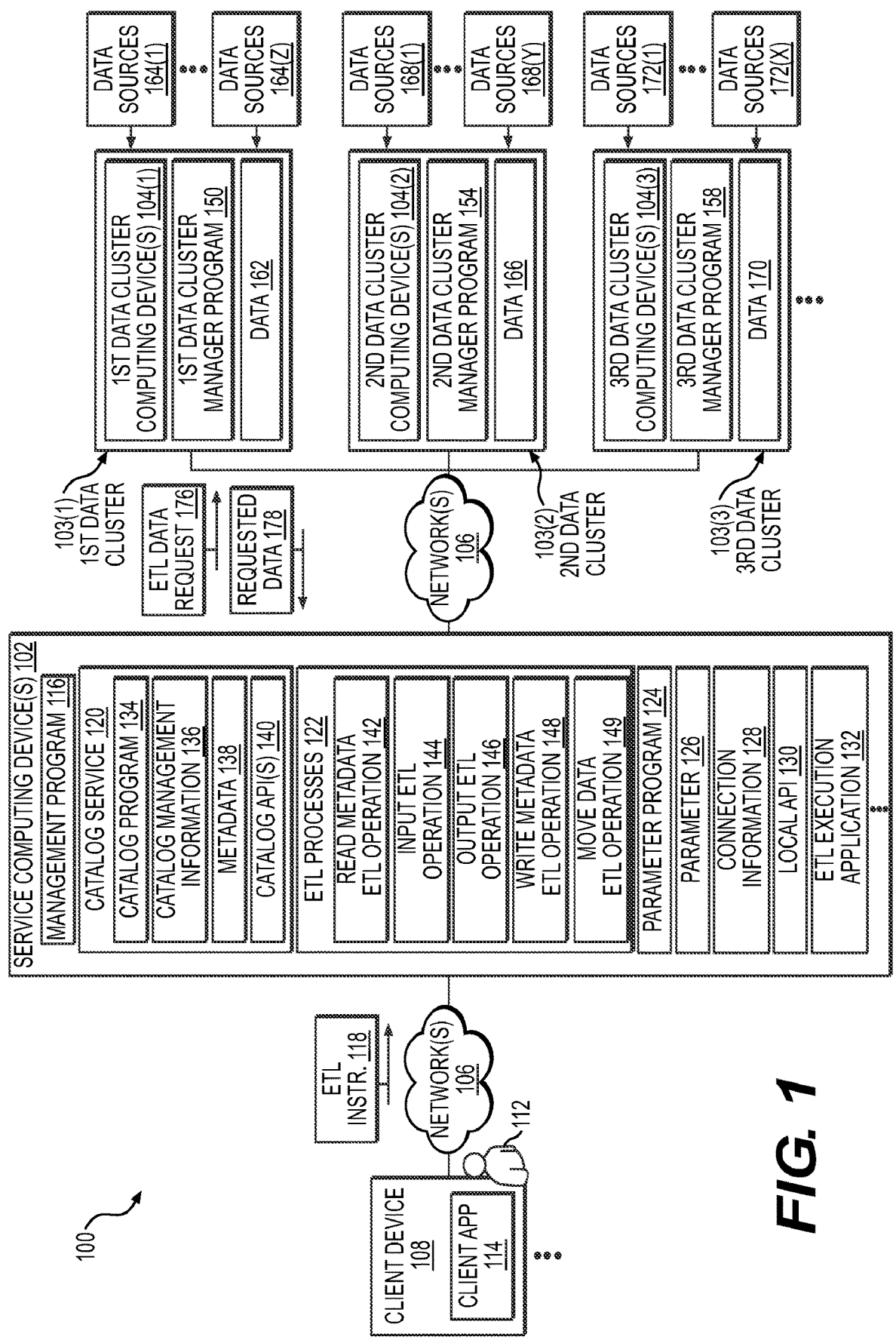
FIG. 1 illustrates an example architecture of a system able to perform ETL operations with a plurality of non-homogenous versions of data clusters according to some examples.

Some implementations herein are directed to techniques and arrangements for enabling a single instance of an ETL execution application to execute an ETL process that includes one or more ETL operations or processes successively and/or concurrently with a plurality of different data cluster implementations. Examples herein provide a solution that includes the ability to execute an ETL process, such as a transformation including one or more ETL operations, on data resources managed by a catalog service that is able to dynamically handle location, format and/or schema of a data resource by determining the location, format and/or schema at runtime or execution of the ETL process to process the data resources. For example, in some systems the logic or steps of the ETL process may be specifically configured or fixed to respective locations, format, and/or schema or data resources to be processed. During an ETL process, if the source or location of the data to be processed is a file a user or client would need to know the location of the file, how to connect to it, and the format and schema of the file in order to process it. For example, the user or client may need to know the file URL, the security credentials to access that URL, and the format of the file. This file data may be a fixed input into the transformation. If the file ever moved or the format of the file changed, the ETL process logic dependent on that file would need to be changed or else an error would occur due to either not knowing the schema, file location, or file format. In other words, in such an example, if the location, format and/or schema of a resource to be processed is changed after the logic or ETL operations of the ETL process are configured, the ETL operations or ETL process themselves need to be changed or the execution of the ETL process may result in errors. Further, changing the ETL process logic or ETL operations if a resource location, format and/or schema of a data resource is changed is burdensome and may require many steps and is prone to errors. Additionally, in some systems the ETL process may be specifically configured or fixed to connection information to connect to a catalog service. However, if the connection information changes, such as authentication or credentials of a user or client for a catalog service, the ETL logic or ETL operations may need to be changed as well.

The techniques and arrangements herein provide a technical solution for the ETL process to dynamically handle a change in location, format and/or schema of a data resource to be processed without, for example, having to adjust the ETL process logic or ETL operation(s) themselves to handle the change. Additionally, the techniques and arrangements herein provide a technical solution for dynamically handling connection information for connecting to a catalog service without, for example, having to adjust the ETL process logic or ETL operation(s) themselves to handle the change. Accordingly, for example, the techniques and arrangements herein allow for the location, format and/or schema of a data resource to be automatically determined at runtime or execution of the ETL process and effectively enable data processing without being dependent on storage location, format and/or schema of a data resource.

In some examples, the data accessed during execution of the ETL process may be stored within a plurality of storage devices within different storage systems or ecosystems, which may be included in a data lake or data warehouse, for example. Examples of storage systems or ecosystems may include AMAZON S3, MiniIO, or HADOOP Distributed File System (HDFS). Data may also be stored in clusters, which are in communication with the data sources. The data may also be stored in association with corresponding metadata. In some implementations, the metadata is stored and managed in a catalog service.

For example, cluster implementations accessed during execution of an ETL processes herein may store, manage, or otherwise maintain big data that may include data that comes from business functions, such as through a company's practices and procedures, human data generated from communications, and so forth. Other examples of big data may include database data, demographic data, machine-generated data, such as may be produced by the world's infrastructure systems, various types of sensors of weather, time, location, and so forth. Numerous other types of data will be apparent to those of skill in the art, and implementations herein are not limited to any particular type of data. Data may also be stored as files in comma separated value (CSV) text files and PARQUET data formats, for example. According to some estimates, 80 percent of all big data may be unstructured data that may require some processing, normalizing, or other transformation to be able to provide useful business insights. Furthermore, the volume and variety of big data has been increasing dramatically as has the number of sources of this data.

In some examples herein, the data clusters may be big data clusters, which are a type of computational cluster that is able to store and, in some cases, analyze huge amounts of unstructured data in a distributed computing environment. Accordingly, in some cases, at least some of the different data cluster implementations herein may include HADOOP big data clusters employing various different configurations of HADOOP data storage, and which may further include HADOOP libraries and HADOOP distributed file systems (HDFSs). Additionally, in some cases, at least some of the different data cluster implementations herein may include AMAZON S3 buckets and may employ different configurations of Amazon S3 data storage. In some instances, the data resources may be stored in a cluster or storage system utilizing cloud-based object storage.

As mentioned above, the data stored in the data clusters may be managed and indexed by a data service, such as a data catalog service. The catalog service may manage and index metadata associated with the data. In some instances, the data is managed and indexed in one or more data catalogs, which may be an organized inventory of assets, such as data resources and their metadata. In some examples the data catalog may manage, access, register, and index data stored in the data cluster implementations. In some examples, data, such as a file, is registered in a catalog as a data resource. In some instances, as explained in more detail below, the catalog collects metadata for various types of resources data assets and the metadata points to or indicates the asset's location in storage. Data assets registered in the catalog may be known as data resources and each data resource is given a resource identifier (ID) by the catalog service that uniquely identifies the data resource among other data resources. In some examples, the data resources and metadata indexed and managed by a catalog may be stored in multiple cluster instances. Further, the catalog may also manage updating the metadata. Additionally, in some examples the catalog program may manage virtual folders, which may be an index and may contain pointers to one or more data resources, such as files. Also, in some examples, each virtual folder may indicate a mapping or logical correspondence to storage locations in a data cluster or data source. For example, a virtual folder may include data resources, such as files, sub-(virtual) folders and other objects. Further, the catalog may also manage and store metadata for each virtual folder managed by the catalog service, which may include a name, resource (ID) and storage location.

For example, an ETL process (or transformation) may be a network of logical tasks called steps and ETL processes may be referred to as data flows. As one example, each ETL operation (e.g., discrete step) in an ETL process, such as a transformation, when executed by an ETL execution application, may be performed on or use data resources and/or metadata managed by a catalog program of a catalog service. Accordingly, the ETL execution application may connect and access to a catalog service to perform each ETL operation of an ETL process. Additionally, each ETL operation, upon execution, may use parameters that are specified or configured and supplied to ETL operation(s) to drive the logic of each step to complete each ETL operation.

In some instances, the parameters may be configured or specified by a user and the parameters may be stored for later or recurring use. In some implementations, each parameter consists of a parameter description and a corresponding parameter value. In some instances, parameters and their values may indicate metadata managed by the catalog service. In some instances, parameter values may indicate or specify connection information to connect to a catalog service. Further, in some instances, parameter values may indicate information about how a resource should be stored (e.g., format, name, type) and where a resource should be stored (e.g., virtual folder or cluster). The parameters may be configured or specified to supply the information necessary for execution and completion of an ETL process. Accordingly, an ETL process, upon execution, may rely on the parameters to drive the logic and/or steps of the ETL process. In some implementations the parameters are input or supplied to an ETL process (which may include one more ETL operations) upon execution of the ETL process by an ETL execution application.

Accordingly, the examples herein enable an ETL execution application to execute an ETL process that includes one or more ETL operations, which may access one or more catalogs managed by the catalog service and may communicate to send and receive requests to read and write data resources to a plurality of data clusters. The techniques and arrangements described herein allow data resource(s), such as a file(s), managed by the catalog service to be identified, located or read without specifying the physical or logical location (e.g., file path), format and/or schema of the data resource in the parameters supplied or input to the ETL process and/or without specifying the location, format and/or schema of the data resource(s) to be processed as a fixed input to the ETL process logic. Rather, by the techniques and arrangements descried herein the location, schema or format may be automatically determined at runtime or execution of an ETL process by the ETL execution application based on one or more of the parameter values input to the ETL process.

In addition, the ETL execution application may extract and/or store data on any of the multiple data cluster implementations during any discrete ETL operation of the ETL process while communicating with the catalog service. For example, the instance of the ETL execution application may execute an ETL process that includes multiple ETL operations performed on multiple data clusters, serially and/or concurrently. When an ETL operation requires interacting with a catalog service, the ETL execution application may authenticate a user to the catalog using the user's credentials and authentication information, which may be supplied in the parameters. The ETL execution application may communicate and connect with the catalog service using a local Application Programming Interface (API) and/or the catalog API.

For example, upon execution of an ETL process or prior to execution of an ETL process, the parameters are passed or supplied to the ETL execution application. In some instances, the parameters are injected or supplied to each ETL operation that is part of an ETL process executed by the ETL execution application. In some instances, two or more ETL operations of the ETL process use the same parameters. In some examples in which an ETL process includes two or more ETL operations, one ETL operation may use one or more parameters that are not used by the other ETL operation(s). That is, some parameters are only utilized by certain ETL operations of the ETL process (and not all ETL operations of the ETL process). Further, if a parameter specific to a certain ETL operation is not specified, the ETL execution application may resort to a default value for that parameter.

Additionally, as an example, suppose an ETL process is executed, by an ETL execution application, to read data resource contents from respective data clusters and write the data resource contents to a destination in a data cluster. The destination may be a virtual folder managed by the catalog service. An ETL process or data flow may be configured and executed, by the ETL execution application, that includes a combination of an input ETL operation and an output ETL operation. Parameters for the ETL process may be supplied to the ETL process as inputs, for example, to drive the steps of the input ETL operation and the output ETL operation. In some examples, the parameters are supplied to the ETL execution application that executes the ETL process. By communicating and connecting with a catalog service, e.g., by utilizing local APIs and/or catalog APIs, a connection with the catalog service may be established based on connection information included in the parameters. Further, a catalog program of the catalog service may execute a search of metadata managed by the catalog service using a query obtained from one or more of the parameters. The query may include any type of metadata managed by the catalog service. In some examples, the parameter used as a search query in the catalog service may have a value indicating one or more resource IDs that each identify a different data resource. In such examples, the returned metadata may include metadata associated with data resource(s) that satisfy or matches the one or more resource IDs in the query. This process may be referred to as a read metadata ETL operation. That is, in some implementations, an input ETL operation may include and/or execute a read metadata ETL operation.

The returned metadata may be read to determine respective locations, format and/or schema of data resource(s) associated with the returned metadata, which may be the data resource(s) identified by the resource IDs in a search query. Additionally, based on the location, format and/or schema determined from the returned metadata, the data resource contents may be read or retrieved from the determined location in one or more data clusters. In some examples, the data resource contents may be read based on the determined format and/or schema. In an example in which the data resource is a CSV file or Parquet file, file data contents may be read row by row. Accordingly, upon configuring the input ETL operation of the ETL process, the location, format and/or schema of data resources to be retrieved from the data clusters does not need to be input to the ETL process prior to execution of the ETL process. Rather, the location, format and/or schema of data resources to be retrieved is determined automatically at runtime by referencing the returned metadata.

Additionally, a storage location destination of the data resource(s) associated with the returned metadata may be determined. For example, the supplied parameters may indicate a virtual folder as a destination of the data resource contents. The storage location destination may be determined by querying the metadata with the parameter that indicates the destination virtual folder. The storage location destination of the destination virtual folder may then be determined from the returned metadata. Accordingly, the data resource contents read from the data cluster(s) may be written and stored in the determined storage location destination. In some examples, the ETL execution application may write data to and communicate with the data clusters using an API. Additionally, in some examples, the data resource contents may be written to the data cluster(s) according to specifications and settings defined in the supplied parameters, such as a data resource name, format, whether to overwrite data resources already stored in the determined storage location destination and whether to compress the data resource contents. Accordingly, the storage location destination mapped or corresponding to a destination virtual folder, for example, specified in the supplied parameters may be automatically determined at runtime or execution of an ETL output operation. Additionally, in some instances, the catalog service may be updated and metadata associated with the data resource contents may be updated to indicate the change of location to the storage location destination.

In another example, suppose an ETL process is executed to add metadata or change metadata associated with an existing data resource, such as a file. In some examples, an ETL process may execute a write metadata ETL operation. In a write metadata ETL operation, resource IDs of metadata to be updated or written to are obtained. In some examples, the resource ID(s) are input to the write metadata ETL operation from a different ETL operation executed previously or in parallel, such as an output ETL operation. In some examples, the target metadata may be obtained by querying the metadata managed by the catalog service using resource ID(s) as a query. Then new metadata may be written or the returned metadata may be changed or updated. For example a name, location, format and/or schema may be updated based on a change in the respective name, location format and/or schema of the associated data resource. In some examples, a user may add to the existing metadata by choosing the type of metadata from a dropdown menu. Further, in some examples, existing metadata types may be updated based on an instruction from the client device.

As yet another example, suppose an ETL process is executed to move data resource contents from one virtual folder to another virtual folder which may be a different data cluster within one catalog or a different cluster in another catalog managed by the catalog service. In such an example, the ETL process may include a move data ETL operation. In some implementations one or more resource IDs of target data resources to be moved are obtained from the supplied parameters. The move targets may be one or data resources, such as files and/or virtual folders. Further, a catalog program may search metadata managed by the catalog service based on a query of the obtained one or more resource IDs and return metadata satisfying the query as a search result. In some instances, the location, format, and/or schema of each data resource that is associated with the returned metadata may be determined based on the returned metadata. Further, based on the location of each data resource determined based on the returned metadata, the data resource contents of each data resource may be read from the determined location of the data cluster(s) 103. Accordingly, for example, if the data resources associated with the returned metadata are CSV files, the data contents of the CSV files may be read or streamed row by row. Additionally, storage location destination for the data resource contents read from the target data resources to be moved may be determined and the read data content resources may be stored in the determined storage location destination(s). The determined storage location destination of each data resource to be written may be a storage location of a destination virtual folder.

Further, specifications and/or settings about the data resource contents of the data resources to be written may be determined based on referring to the supplied parameters. For example, the specifications and/or settings may indicate a name, format, and whether to overwrite a (conflicting) data resource existing at the determined storage location(s). Additionally, in some instances, a parameter may be included that indicates whether to update an existing file and whether the file should be stored in a compressed state. Another parameter may indicate whether to maintain a source virtual folder structure upon writing or moving a virtual folder and its contents to the determined storage location destination of a destination virtual folder.

Accordingly, the contents of the data resource(s) may be written and stored at the determined storage location(s) according to the specifications and/or settings that are configured or specified in the supplied parameters. Accordingly, in an example that the data resources to be moved are CSV files, the data resource contents of the CSV file is read row by row and stored in the determined storage location destination(s) according to the specifications and/or settings.

FIG. 1 illustrates an example architecture of a system 100 able to perform ETL processes and ETL operations that use and interact with a catalog program according to some examples. The system 100 includes one or more service computing device(s) 102 that are able to communicate with, or otherwise coupled to, a plurality of data clusters 103, each data cluster 103 including a plurality of computing devices 104 coupled to the one or more service computing device(s) 102 through one or more networks 106. Further, the service computing device(s) 102 are able to communicate over the network(s) 106 with one or more client computing devices 108.

In this example, three data clusters 103 are illustrated comprising a first data cluster 103(1), a second data cluster 103(2), and a third data cluster 103(3), although more or fewer data clusters may be included in other examples. Accordingly, implementations herein are not limited to any particular number of the data clusters 103. Further, the plurality of data cluster computing devices 104 may be arranged as first data cluster computing device(s) 104(1) at the first data cluster 103(1), second data cluster computing device(s) 104(2) at the second data cluster 103(2), third data cluster computing device(s) 104(3) at the third data cluster 103(3), and so forth. The data cluster computing devices 104 may include, for each data cluster 103, a respective data cluster manager program 150, 154, 158 that is executable on at least one data cluster computing device 104 of each data cluster 103. Each data cluster 103 may store data resources, such as data files and, in some instances, metadata associated with the stored data.

In some examples, each different data cluster 103(1)-103(3) may have a different software version installed on its respective computing devices 104(1)-104(3). For example, the respective computing devices 104(1)-104(3) of the respective different clusters 103(1)-103(3) may be configured using different data cluster platforms and architectures, such as a HADOOP framework or Amazon S3 cloud architecture. Thus, as one example, the first version data cluster computing devices 104(1) of the first data cluster 103(1) are configured with a first version of a data cluster platform, such as from a first distribution entity; the second version data cluster computing devices 104(2) of the second data cluster 103(2) may be configured with a second version of a data cluster platform, such as from a second distribution entity that is different from the first distribution entity; and the third version data cluster computing devices 104(3) of the third data cluster 103(3) may be configured with a third version of a data cluster platform from a third distribution entity that is different from the first and second distribution entities. In some examples, some or all of the implementations of the data cluster computing device(s) 104(1)-104(3) may be configured as big data clusters, such as HADOOP big data clusters, that are able to store and analyze huge amounts of unstructured data in a distributed computing environment.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102, the data cluster computing devices 104, and the client device(s) 108 are able to communicate over the one or more networks 106 using wired or wireless connections, and combinations thereof.

In some examples, the service computing device(s) 102 may include one or more servers that may be embodied in any number of ways. For instance, the programs, other functional components, and at least a portion of data storage of the service computing device(s) 102 may be implemented on at least one server, a cluster of servers, a server farm, a data center, a cloud-hosted computing service, and so forth, although other computer architectures may additionally or alternatively be used. Additional configuration details of the service computing device(s) 102 are discussed below with respect to FIG. 8.

Each client device 108 may be any suitable type of computing device, such as a desktop, laptop, tablet computing device, mobile device, smart phone, wearable device, terminal, and/or any other type of computing device able to send data over a network. A user 112 may be associated with a respective client device 108, such as through a respective user account, user login credentials, or the like. Furthermore, the client device(s) 108 may be able to communicate with the service computing device(s) 102 through the one or more networks 106, through separate networks, direct connection, or through any other suitable type of communication connection.

Further, each client device 108 may include a respective instance of a client application 114 that may execute on the client device 108, such as for communicating with a management program 116 or other programs or applications executable on the service computing device(s) 102, as discussed below. In some cases, the client application 114 may include a browser or may operate through a browser, while in other cases, the client application 114 may include any other type of application having communication functionality enabling communication with the management program 116 over the one or more networks 106. As one example, the user 112 may employ the client application 114 to communicate with the management program 116, such as for sending one or more ETL instructions 118 to the management program 116 to configure and/or schedule one or more ETL processes 122 for execution by an execution instance of an ETL execution application 132 on the service computing device(s) 102. ETL instructions 118 may also include instructions to configure or specify one or more parameters 126 stored and configured on the service computing device(s) 102.

The service computing device(s) 102 may execute the management program 116 and the ETL execution application 132 for executing the one or more ETL processes 120 that may be configured by the user 112. Each ETL process 122 may include one or more ETL operations that are performed during execution of the ETL process 122, such as for extracting data from a specified data cluster 103, transforming data, or loading data to a specified data cluster 103. Additionally, the ETL operations performed during execution of the ETL process 120 may include a read metadata ETL operation 142, an input ETL operation 144, an output ETL operation 146, a write metadata ETL operation 148 and a move data ETL operation 149. The ETL process 120 and ETL operations may be configured according to ETL instructions 118 from the client application 114. Additionally one or more ETL operations and one or more ETL processes 120 may be saved and stored on the service computing device(s) 102.

The service computing device(s) 102 may further include a catalog service 120 that includes a catalog program 134 that executes and manages one or more catalogs of data resources stored in the data clusters 103(1-3). In some examples the data catalog program 134 may manage, access, register, and index data stored in the data clusters 103. In some examples, data, such as a file, is registered in a catalog as a data resource. The catalog program 134 may also manage and may store metadata 138 associated with the data and may manage updating the metadata 138. In some instances the catalog service collects metadata 138 for various types of resources and the metadata 138 points to or indicates the data resources location in storage, such as a location in a data cluster 103. In some instances, each data resource managed by the catalog program 134 is provided a resource ID that is unique with respect to each data resource. In some examples, the data 162, 166, 170 and metadata 138 indexed and managed by in one catalog may be stored in multiple data clusters 103(1-3). Additionally, in some examples the catalog program 134 may manage virtual folders, which may contain an index or mapping of resources, such as files and metadata, sub-folders and other objects. Further, the catalog program 134 may also manage a resource ID for each virtual folder. For example, the catalog program 134 may execute searches with a search query against metadata 138 managed by the catalog service 120. The catalog program 134 may communicate with the ETL execution application 132 via local API 130 and/or via catalog API(s) 140. Further, the catalog program 134 may communicate with the data cluster manager programs 150, 154, 158 via catalog API(s) to send ETL request data 176, such as data resource read requests and receive ETL requested data 178. Also, the catalog program 134 may communicate with the client application 114 to receive requests, such as within ETL instructions 118 and to send information, such as metadata returned in a search result. As discussed above, the catalog search query may be provided to the catalog program 134 as a parameter among one or more parameters passed to the catalog program 134 by the ETL execution application 132 via local API 130 and/or catalog API(s) 140. Additionally, the catalog program 134 may receive information, such as metadata 138, parameters, connection information, including client credentials and authentication information from the ETL execution application 132 via API 130 and/or catalog API(s) 140. The catalog program 134 may also authenticate users and maintain connections with the client application 114, ETL execution application 132 and/or the data clusters 103. Additionally, the catalog program 134 may read or retrieve data 162, 166, 170 from the data cluster 103. The data resources managed by the catalog service 120 and stored in the data clusters 103 may be referred to as data 162, 166, 170 herein. The catalog program 134 may also write data to the data clusters 103 and write metadata 138 to add or update metadata 138. Further, the catalog program 134 may register data resources, such as data 170 and metadata 138, upon creation, copy, migration or change of location in an appropriate catalog managed by the catalog service 120. In some instances the catalog program 134 indexes and re-indexes the resources either manually or on a periodic and automatic basis. The catalog program 134 may also manage and store catalog management information 136, which may include indexing information of the resources managed by the catalog program 134, and resource IDs of data resources managed by the catalog program 134 among other information managed by the catalog program 134 to manage and register data resources.

In some implementations, the catalog management information 136 may contain information of the virtual folders managed by the catalog service 120, which may include the index information of the virtual folder and may contain the pointers of the virtual folder. The catalog management information 136 may also contain the storage locations within the data cluster(s) 103 or data source(s) 164, 168, 172 that the pointers point to. Further, in some instances, the catalog management information 136 may contain mappings of the virtual folders, which may include logical correspondence to data resource(s) and/or storage locations within a data cluster 103 or data source 164, 168, 172.

In some instances the metadata 138 managed by the catalog service 120 includes a plurality of metadata types, which may include: a resource name, which may indicate a name of the resource in a catalog managed by the catalog service 120; a resource ID, which may indicate a resource identifier that uniquely identifies a data resource among the data resources managed by the catalog service 120, such as an identification key; a resource type, which may indicate a type of data 162, 166, 170 associated with the data resource in a catalog; an origin, indicating an origin of a data resource in a catalog, which may be related to its linage or its point of origin in a data cluster 103; and a location indicating a storage location of a data resource 103, which may be a physical location in a data cluster 103 and in some instances a location in a data source 164, 168, 172 and may be a file path. The location may also indicate a logical location or a physical location of the stored data resource. Further, the metadata type indicating the location may point to data 162, 166, 170 stored in files that are stored in the data clusters 103 and may indicate a data file's data cluster 103 location. Metadata 138 may also include, as location information, a data source universal resource indicator (uri) and a resource path within the respective data source 164, 168, 172 and/or cluster 103(1-3). The data source universal resource indicator (uri) and resource path may be combined, by the catalog program 134 for example, to determine the location of the data resource associated with the metadata 138.

In some examples, the metadata types of the metadata 138 may also include a schema of a data resource, which may describe a format, a data structure, or rules of a file and/or information about a number of columns of the file, for example. In some examples the schema may indicate how data in each cell should be formatted in a file. The schema may be in text file format. In some examples, metadata 138 may also indicate a format of a file, such as whether the file is a CSV file or Parquet file, for example.

Further, the metadata of a virtual folder may indicate the storage location (e.g., file path) of the virtual folder in a data cluster 103 or data sources 164, 168, 172. In some implementations, the metadata of a virtual folder may include the storage locations (of data resource(s)) mapped to the virtual folder. For example, the metadata may point to a data structure having such mapping or index information, which may be stored in the catalog management information 136, for example. Additionally, the metadata of a virtual folder may indicate all the resource IDs of resources within the virtual folder.

Metadata 138 may also include tags, which may be predefined or added and which provide descriptions of a data resource. Other examples of metadata 138 types include a size of a data resource and compression information. The above examples of the types of metadata stored in the metadata 138 are not limiting and other types of metadata may be included and managed by the catalog program 134.

In addition, one, some, or all of the data clusters 103 may receive data from various data sources and may store the received data at the respective data cluster 103. In this example, the first data cluster 103(1) may receive data 162 from data sources 164(1)-164(z); the second data cluster 103(2) may receive data 166 from data sources 168(1)-168(y); and the third data cluster 103(3) may receive data 170 from data sources 172(1)-172(x). Furthermore, as discussed below, in some cases the data 162, 166, 170 stored at the respective data clusters 103(1), 103(2), 103(3) may be received from the service computing device(s) 102 and/or other ones of the data clusters 103, such as through ETL processing, rather than, or in addition to, being received from the data sources 164, 168, 172.

The service computing device(s) may further include a parameter program 124 that may configure or specify parameters 126 for ETL operations and may store parameters 126 on the service computing devices(s) 102. For example, the parameter program 124 may communicate with a client app 114 to receive one or more inputs to configure or specify respective parameters. The parameter inputs may be parameter values from the client application 114 may be included as ETL instructions 118. In some examples, the parameters 126 may be configured or specified via inputs in ETL instructions 118 by a user interface on the client device 108. In such an example, the parameter program 124 receives parameter values input via the client application 114 and stores the parameter values as the respective values of the parameters 126. For example, the parameters 126 may be supplied, passed or sent to the ETL execution application 132 via API(s) 130 and upon execution of an ETL process 122 by the ETL execution application 132, the one or more ETL operations of the ETL process 122 being executed rely on the supplied parameters 126 as inputs to drive the logic of each step of the ETL process 122. Further, for example, each ETL operation is aware of the supplied or passed parameters 126. Additionally, in some implementations, one or more parameters 126 may be supplied, passed or sent to the catalog program 134 via API(s) 130. Even further, in some implementations, the ETL execution application 132 may obtain or read the parameters 126.

Additionally, the service computing device(s) 102 may store and manage connection information 128 to connect to the catalog service 120. In some implementations, the connection information 128 may include authentication information of a client to connect to the catalog service 120. In some implementations, a user provides, via the client application 114 the connection information 128, which is stored on the service computing device(s) 102. The connection information 128 may be accessed and used by the ETL execution application 132 to connect to the catalog service to perform an ETL process 122. Further, in some implementations, the connection information 128 may be accessed and used by the parameter program 124 to populate or configure one or more appropriate parameters that define connection information within the parameters 126.

FIG. 2 illustrates a data structure illustrating exemplary parameters according to some implementations. The parameters 200 shown in FIG. 2 are exemplary and do not represent every parameter type 202 that may be configured or specified. In some instances, each parameter 126 has a parameter type 202 and a value 204 that may be specified or configured. The parameter types 202 and values 204 passed to the ETL execution application 132 may depend on the ETL operations to be executed. That is, not every ETL operation of an ETL process 122 uses all parameters 126 passed to the ETL execution application 132 even though each ETL operation of the ETL process 122 may have has access to all of the parameters passed to the ETL execution application 132. In some examples, the parameters 202 supplied or passed to an ETL execution application 132 may include a parameter enable flag 206, which may have a value indicating true or false, indicating whether to use the other parameters supplied to execute the ETL process 120.

The parameters 200 may also include a catalog authentication type parameter 208 with a value 204 indicating the catalog authentication type. For example, the catalog authentication type 208 may indicate the authentication type to use upon connection to the catalog service 120. For example, different values for the catalog authentication type parameter 208 may indicate different catalog authentication types. As an example, the catalog authentication parameter 208 value may be an integer or code. A value, such as "1" may indicate that only certain credentials such as a catalog username and a catalog password are required to authenticate to the catalog service 120.

In some examples, the catalog authentication type 208 may have a value indicating that authentication to the catalog service 120 uses an authentication protocol, such as OAuth or OAuth 2.0. In such an example, additional authentication parameters are configured such as a catalog client secret 212 and catalog authentication token URL 214. For example, the catalog client secret 212 may be a string, such as an alphanumeric string or a code that conforms with the protocol indicated by the catalog authentication type 208. Also, the catalog authentication token URL 214 may be an address or URL to obtain a catalog authentication token according to the protocol indicated by the catalog authentication type 208. Other parameters 202 may be configured as necessary according to the catalog authentication type 208. In some instances, a catalog client identification 210 may be configured as a parameter 202. Further, the catalog authentication type 208 value may indicate that authentication to the catalog service 120 is not required. Another parameter type 202 and associated value is a catalog URL 220 which may indicate a URL to connect with the catalog service 120 and/or a particular catalog managed by the catalog service 120. For example, the ETL execution application 132 may refer to the catalog URL 220 parameter to connect to the catalog service 210. Additionally, for example, the parameter values 202 for the appropriate connection information and authentication information, depending on the catalog authentication type 208 may be configured or specified by the parameter program 124. Further, in some implementations, the parameter program 124 may read the connection information 128 to obtain the parameter values 202 for the appropriate connection information and authentication information depending on the catalog authentication type 208.

In some examples, the values of one or more of the catalog authentication type 208, catalog client identification 210, catalog client secret 212, catalog authentication token URL 214, catalog password 216, catalog URL 220, and catalog username 222 may be collectively referred to as connection information 128, which, as mentioned previously, may be passed or supplied with other parameters to the ETL execution application 132 so that the catalog service 120 may be connected and accessed appropriately. Additionally, the parameters 202 relied on for connection information may previously be stored as mentioned above and selected from a pull down menu and automatically populated in the parameter values 202 through a user interface. Further, inputs from the client device 108 via communication with the client application 114 and the parameter program 124 may be used to enter and configure the parameter values 202.

In some implementations, a catalog resource ID 218 value may be configured or specified and included as a parameter 202, which may indicate a resource ID managed by the catalog service 120. The resource ID may be an alphanumeric key or code. Further, in some implementations, a catalog move target data source 224 value may be configured or specified which may indicate a data cluster 103, data source 164, 168, 172, or virtual folder, for example, indicating a write destination of a data. In some examples, the catalog move target data source 224 value may be a resource ID of a virtual folder managed by the catalog service 120. The catalog move target data source 224 may be a parameter 202 utilized by the move data ETL operation 149, for example.

In some examples, parameters 200 include a catalog write file format 226 value, which may specify the file format of a resource to be written, such as CSV or Parquet. Accordingly, upon execution of an ETL process 122, the ETL execution application 132 may refer to the value 202 of the catalog write file format 226 parameter type to determine which format to use to store the data contents of the data resource upon writing the resource to a data cluster 103, for example. A catalog write name 228 parameter type may be configured or specified to indicate a name of the data resource to use upon writing the data resource. Further, a catalog write virtual folder 230 parameter value may indicate a name of a virtual folder that is a destination virtual folder of a data resource. The virtual folder named in the value 202 of the catalog write virtual folder 230 parameter may be a virtual folder that does not exist in the catalog service 120. Also, the catalog write virtual folder 230 parameter may also indicate a resource ID of a destination virtual folder of a data resource. The catalog write folder 230 parameter may be utilized during execution of an output ETL operation 146, for example. In some implementations, a (conflicting) data resource may already exist at a storage location destination. In such an example, the ETL execution application 132 may refer to the catalog overwrite resource 232 parameter value to indicate whether to overwrite the existing data resource. Further, the catalog preserve folder structure 234 parameter type may have a value 202 indicating whether to preserve the folder structure of a virtual folder, for example, upon moving the folder to a storage location destination. For example, resources may be stored in virtual folders that include one or more sub-virtual folders as a folder structure. Upon moving a virtual folder and its contents, for example, the ETL execution application 132 may refer to the value 202 of the catalog preserve folder structure 234 parameter type to determine whether the structure is maintained upon writing the folder and its contents to the storage location destination. If, for example, the value of the catalog preserve folder structure 234 parameter is false, the structure is not preserved or maintained upon writing to the storage location destination. The move data ETL operation 149 may utilize the catalog preserve folder structure 234 parameter, for example.

Figure 3:
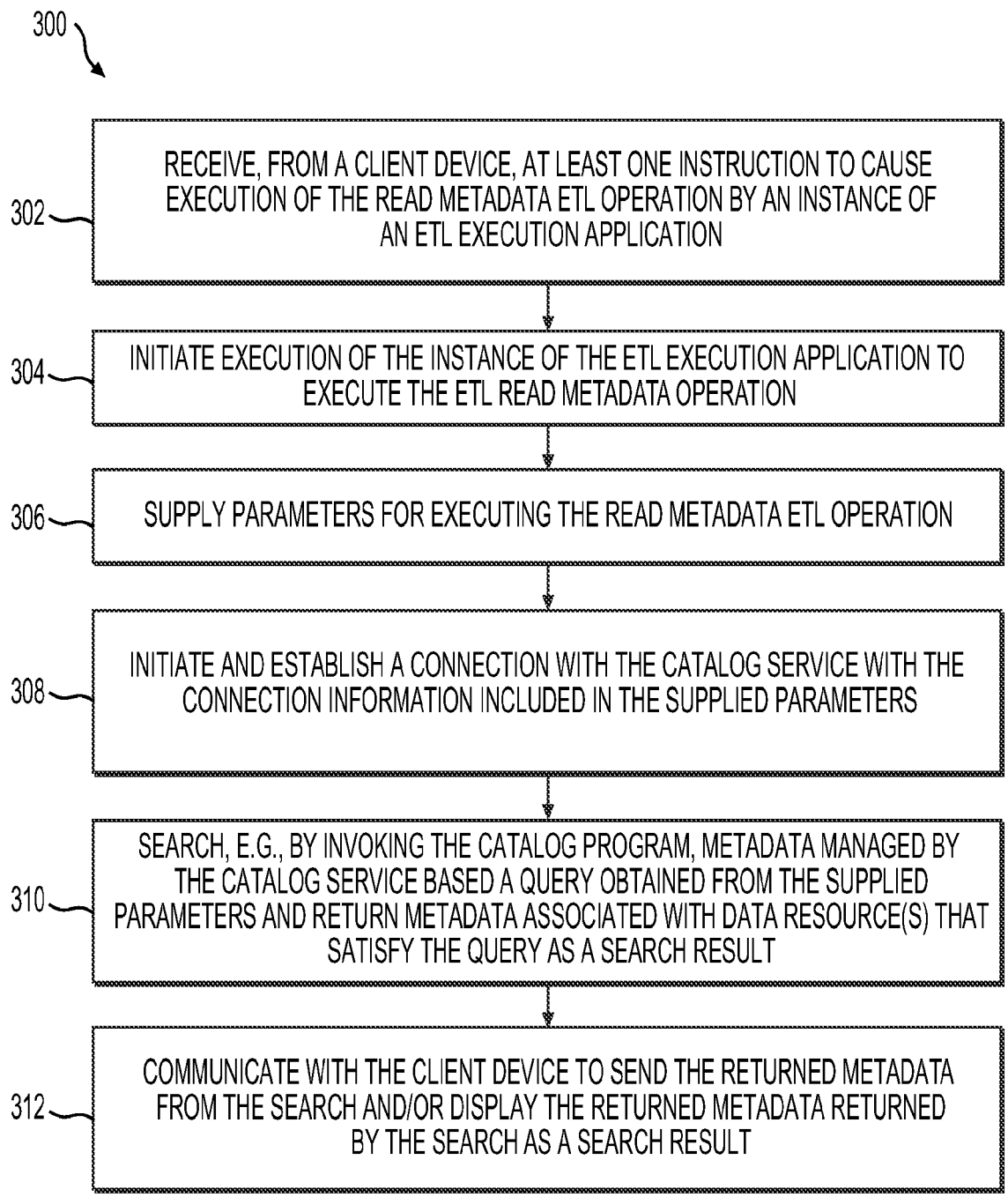
FIG. 3 is a flow diagram illustrating an example process for performing a read metadata ETL operation according to some implementations.

FIG. 3 is a flow diagram illustrating an example process for performing a read metadata ETL operation according to some implementations. For example, the read metadata ETL operation 300 may be executed at least in part by the one or more service computing device(s) 102 executing the ELT execution application 132, or the like.

At 302, the service computing device 102 may receive, from a client device 108, at least one instruction to cause execution of the read metadata ETL operation 142 by an instance of an ETL execution application 132.

At 304, the service computing device 102 may initiate execution of the instance of the ETL execution application 132 to execute the ETL read metadata operation 142.

At 306, the service computing device 102 may supply parameters 126 for executing the read metadata ETL operation. In some instances, the parameter program 124 may be invoked to supply one or more parameters 126 to the ETL execution application 132. In some instances, one or more parameters 126 may be supplied to the process logic of the ETL operation by the parameter program 124 or the ETL execution application 132 to be executed by the ETL execution application 132.

At 308, the service computing device 102 may initiate and establish a connection with the catalog service 120 with the connection information included in the supplied parameters. For example, the ETL execution application 132 may communicate with the catalog program 134 to authenticate and connect to the catalog service 120 using parameter values corresponding to the connection information, which may include one or more of the catalog authentication type 208, catalog client identification 210, catalog client secret 212, catalog authentication token URL 214, catalog password 216, catalog resource ID 218, catalog URL 220, and catalog username 222 to connect with the catalog service according to the authentication type 208. In some examples, the ETL execution application 132 may determine the authentication type based on the authentication type 208 and may obtain a catalog authentication token from the URL identified in the catalog authentication token URL 214 parameter. The ETL execution application 132 may obtain other information necessary for connection to the catalog service 124 depending on the catalog authentication type and send the information to the catalog program 124 accordingly.

At 310 the service computing device 102 may search, e.g., by invoking the catalog program 134, metadata 138 managed by the catalog service 120 based a query obtained from the supplied parameters and return metadata associated with data resource(s) that satisfy the query as a search result. For example, the search of the metadata 138 managed by the catalog service 120 may be performed using a query that is included in the supplied parameters. The query may be any type of metadata managed by the catalog service 120. In some implementations, as a search result, the catalog program 134 may return metadata satisfying the metadata of the query. The returned metadata may be all of the metadata associated with data resource(s) having metadata 138 that satisfied the query. This returned metadata may be communicated to the ETL execution application 132 to be used in a different ETL operation of the executed ETL process 122. Further, the metadata 138 managed by the catalog service 120 of each data resource may include metadata 138 indicating a file's cluster location, schema and/or format. Further, the ETL execution application 132 may have access to and can read or refer to the returned metadata.

In some examples, the catalog resource ID 218 parameter may be used as a search query by the catalog program 134 and may have a value indicating one or more resource IDs that each identify a different data file. In such examples, the returned metadata may include metadata 138 managed by the catalog service 120 that satisfies or matches the one or more resource IDs in the query. The resource ID may also indicate a virtual folder. In this instance, the returned metadata may include all metadata of the virtual folder, if any, and/or the returned metadata may include all data resources included in the virtual folder. Further, in some implementations, the parameter used as a search query may be one or more criteria of data resources specified in the metadata 138 managed by the catalog service 120. For example, the criteria may be a range or limit of a metadata value, such as a size of associated data (e.g., 1-4 megabytes (MBs). The parameter used as a query may also be a metadata tag managed by the catalog service 134. The parameters used as a query may also be a string, such as a JavaScript Object Notation (JSON) string. In some instances, the returned metadata is stored on the service computing device 102.

At 312, the service computing device may communicate with the client device 108 to send the returned metadata from the search and/or display the returned metadata returned by the search as a search result, for example.

Figure 4:
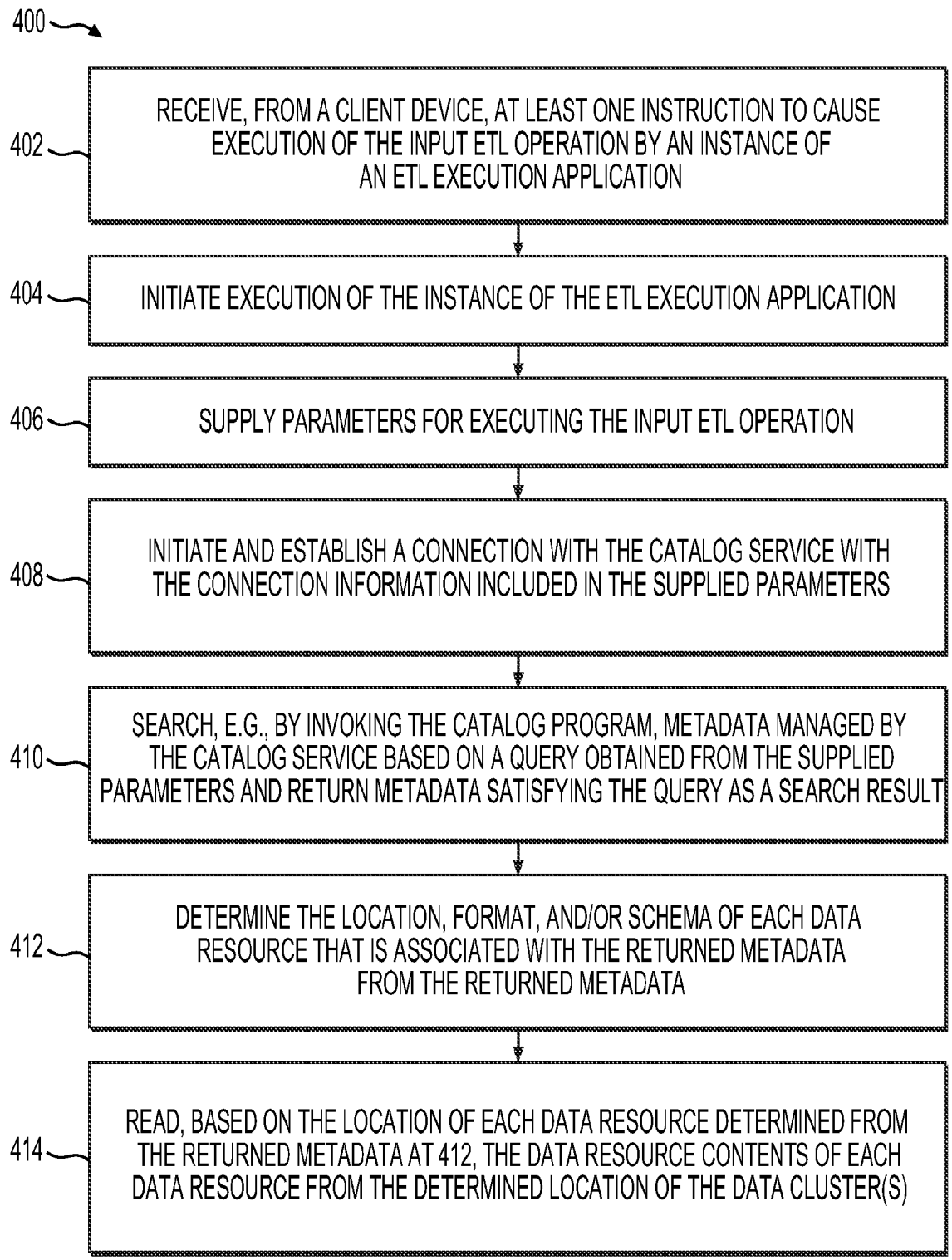
FIG. 4 is a flow diagram illustrating an example process for performing an input ETL operation according to some implementations.

FIG. 4 is a flow diagram illustrating an example process for performing an input ETL operation according to some implementations. For example, the input ETL operation 400 may be executed at least in part by the one or more service computing device(s) 102 executing the ELT execution application 132, or the like.

At 402, the service computing device 102 may receive, from a client device 108, at least one instruction to cause execution of the input ETL operation 144 by an instance of an ETL execution application 132.

At 404, the service computing device 102 may initiate execution of the instance of the ETL execution application.

At 406, the service computing device 102 may supply parameters 126 for executing the input ETL operation. In some instances, the parameter program 124 may be invoked to supply one or more parameters 126 to the ETL execution application 132. In some instances, one or more parameters 126 may be supplied to the process logic of the ETL operation by the parameter program 124 or the ETL execution application 132 to be executed by the ETL execution application 132.

At 408, the service computing device 102 may initiate and establish a connection with the catalog service 120 with the connection information included in the supplied parameters. The process at 408 is similar to the process described above with respect to the process at 308 of the read metadata ETL operation 300. Therefore, the details of the process are not repeated here.

At 410, the service computing device 102 may search, e.g., by invoking the catalog program 134, metadata 138 managed by the catalog service 120 based on a query obtained from the supplied parameters and return metadata satisfying the query as a search result. The process at 410 is similar to the process described above with respect to the process at 310 of the read metadata ETL operation 300. Therefore, the details of the process are not repeated here. Further, in some implementations, in which the input ETL operation 400 is combined with a another ETL operation, such as a read metadata ETL operation 300, the returned metadata from the read metadata ETL operation 300 (e.g., returned metadata at 310) may be used and supplied instead of executing a new search of the metadata in the input ETL operation 400.

At 412, the service computing device 102 may determine the location, format, and/or schema of each data resource that is associated with the returned metadata from the returned metadata. As mentioned above, the metadata 138 managed by the catalog service 120 may include metadata types indicating a location of the associated data resource (such as a file's location in a data cluster), a format of the associated data resource (such as a CSV file or a Parquet file) and/or a schema. The returned metadata may be read, e.g., by the ETL execution application 132, to determine respective locations, format and/or schema of data resource(s) associated with the returned metadata, which may be the data resource(s) identified by the resource IDs in a search query, in some examples. In some implementations, the schema and/or format may be a text file read by the ETL execution application 132 and may indicate fields to read, number of columns, number of rows and other information pertaining to the format of the file. Further, in some examples, the location metadata points to the location of the file in a data cluster 103. In some implementations, the returned metadata may also include, as location information, a data source universal resource indicator (uri) and a resource path within the respective data source 164, 168, 172 and/or cluster 103(1-3). The data source universal resource indicator (uri) and resource path may be combined, by the catalog program 134 logic for example, to determine the location(s) of the data resource(s) associated with the returned metadata.

At 414, the service computer device 102 may, based on the location of each data resource determined from the returned metadata at 412, read the data resource contents of each data resource from the determined location of the data cluster(s) 103. In some examples, the data resource contents may be read based on the determined format and/or schema from the returned metadata. In an example in which the data resource to be read is a CSV file or Parquet file, the contents may be read row by row all of the contents are extracted. Additionally, for example, Parquet data may be decoded and the fields may be extracted using the defined schema indicated by the associated metadata. In some implementations, the streamed or read data may be stored in the computing device or on the client device.

Figure 5:
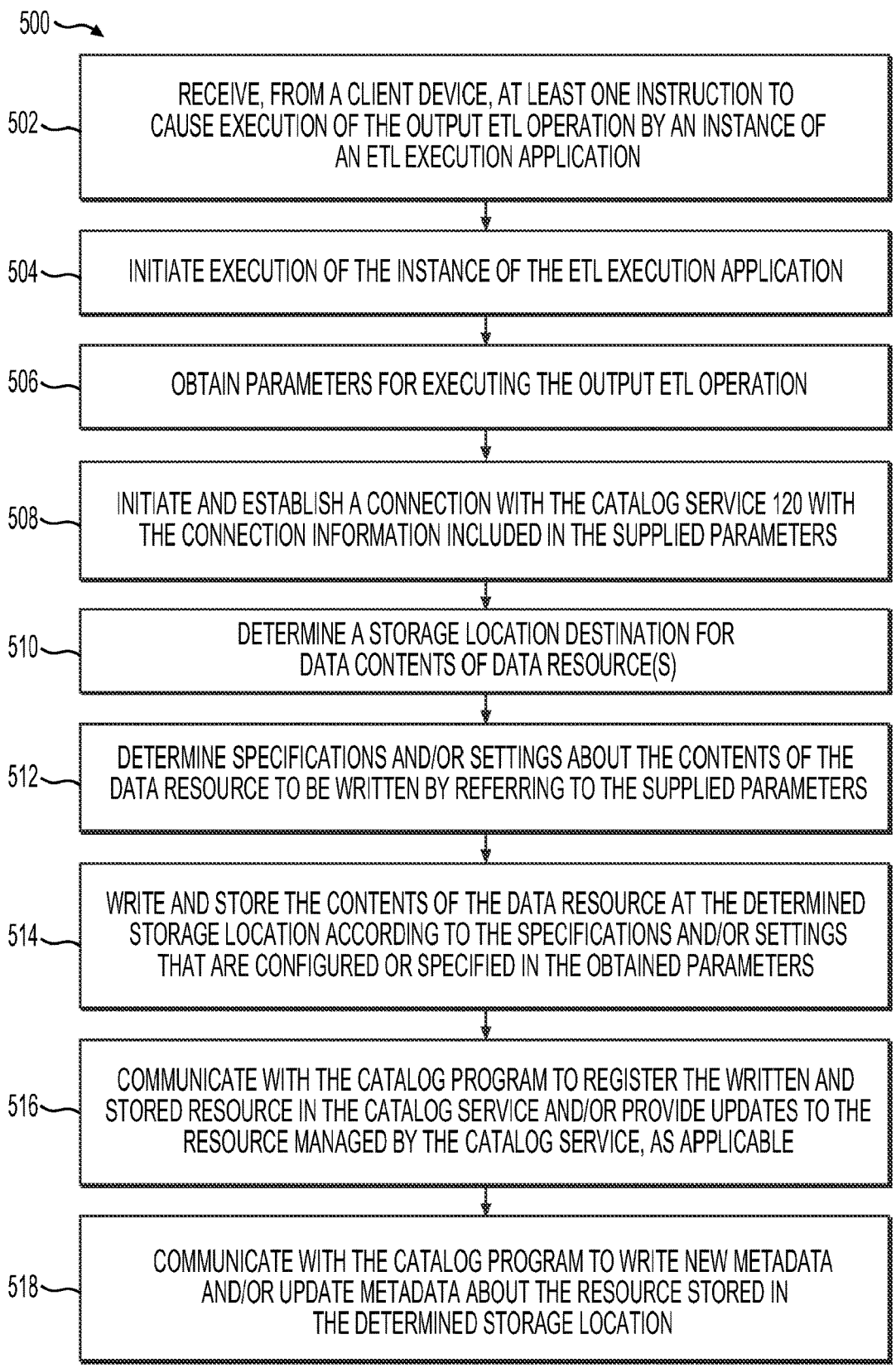
FIG. 5 is a flow diagram illustrating an example process for performing an output ETL operation according to some implementations.

FIG. 5 is a flow diagram illustrating an example process for performing an output ETL operation according to some implementations. For example, the output ETL operation 500 may be executed at least in part by the one or more service computing device(s) 102 executing the ELT execution application 132, or the like.

At 502, the service computing device 102 may receive, from a client device 108, at least one instruction to cause execution of the output ETL operation 146 by an instance of an ETL execution application 132.

At 504, the service computing device 102 may initiate execution of the instance of the ETL execution application.

At 506, the service computing device may obtain parameters for executing the output ETL operation. In some instances, the parameter program 124 may be invoked to supply one or more parameters 126 to the ETL execution application 132. In some instances, one or more parameters 126 may be supplied to the process logic of the ETL operation by the parameter program 124 or the ETL execution application 132 to be executed by the ETL execution application 132.

At 508, the service computing device 102 may initiate and establish a connection with the catalog service 120 with the connection information included in the supplied parameters. The process at 508 is similar to the process described above with respect to the process at 308 of the read metadata ETL operation 300. Therefore, the details of the process are not repeated here.

At 510, the service computing 102 device may determine a storage location destination for data contents of data resource(s). For example, a data resource may be a newly created data resource, an existing data resource managed by the catalog service, or data resource (contents) input or passed from another ETL operation, such as an input ETL operation 144. For example, to determine a storage location destination, the ETL execution application 132 may refer to a value of the catalog write virtual folder 230 parameter, which may indicate an existing virtual folder managed by the catalog service 120 or a name of a virtual folder that does not yet exist in the catalog service 120. In such an example that a virtual folder indicated in the catalog write virtual folder 230 parameter does not exist, the ETL execution application 132 may communicate with the catalog program 134 via the local API(s) 130 and/or catalog API(s) 140 and may communicate with one or more of the data cluster manager programs 150, 154, 158 to register and/or create the destination virtual folder and its mapping or index information. For example, the catalog program 134 may map or index storage locations in the data clusters to the created or registered virtual folder and store the mappings and indices in the catalog management information 136. In another example, the catalog program 134 may receive the location of the created virtual folder from a data cluster 103. The index or mapping information from a data cluster 103 and store the information in the catalog management information 136 and/or metadata 138. In some instances, the determined storage location may be the location of the created virtual folder. In some instances, the determined storage location destination(s) may be the storage locations mapped or indexed to the newly created destination virtual folder.

In some implementations, if the catalog write virtual folder 230 parameter value indicates a name or resource ID of an existing virtual folder managed by the catalog service 120, the ETL execution application 132 may determine the storage location destination(s) mapped to the existing virtual folder based on the metadata 138 associated with the existing virtual folder. For example, the catalog program 134 may search the metadata 138 using the value (e.g., name or resource ID of existing destination virtual folder) of the write virtual folder 230 parameter and the ETL execution application, for example, may read the returned metadata and determine the storage location of the existing virtual folder indicated in the returned metadata. In some instances the ETL execution application may, for example, determine the storage location destination(s) that are mapped or indexed to the existing folder based on the returned metadata and/or by referring to the catalog management information 136.

Additionally, in some instances, the storage location destination may be determined based on the catalog move target data source 224 parameter, which may indicate a destination data cluster 103 or data source 164, 168, 172 of the data resource contents. In such an instance, the ETL execution application 132 may communicate with one or more data cluster manager programs 150, 154, 158 corresponding to the destination or data cluster 103 indicated in the catalog move target data source 224 parameter to determine the storage location destination. Further, in some examples, the determined storage location destination may be a file path, for example.

At 512, the service computing device 102 may determine specifications and/or settings about the contents of the data resource to be written by referring to the supplied parameters. For instance, the supplied parameters may include a catalog write name 228 and/or a catalog write file format 226 indicating a format of the file to be written. A parameter, such as a catalog overwrite resource 232 parameter may be included to inform the ETL execution application 132 whether to overwrite a (conflicting) data resource existing at the determined storage location. Additionally, in some instances, a parameter may be included that indicates whether to update an existing file and whether the file should be stored in a compressed state.

At 514, the service computing device 102 may write and store the contents of the data resource at the determined storage location according to the specifications and/or settings that are configured or specified in the obtained parameters. For example, the ETL execution application 132 may instruct the data cluster manger program 150, 154, 158 corresponding to the data cluster 104 of the determined storage location destination to write the data resource contents according to the catalog write name 228 and/or a catalog write file format 226 of the supplied parameters. Further, for example, upon determining the catalog overwrite resource 232 is true, the ETL execution application 132 may instruct the data cluster manger program 150, 154, 158 corresponding to the data cluster 104 of the determined storage location destination to overwrite an existing (conflicting) data source. Additionally, for example, in an instance where the output ETL operation 500 is combined with an input ETL operation 400, the ETL execution application 132 may send or pass all the read data resource contents to the output ETL operation 500 and therefore the data resources to be written at the determined storage location according to the specifications/and or settings determined from the supplied parameters may be the read data resource contents from the input ETL operation 400.

At 516, the service computing device 102 (i.e., ETL execution application 132) may communicate with the catalog program 134 to register the written and stored resource in the catalog service 120 and/or provide updates to the resource managed by the catalog service 120, as applicable. In some implementations, the catalog program 134 may update the catalog management information 136 accordingly.

At 518, the service computing device 102 may communicate with the catalog program 134 to write new metadata and/or update metadata about the resource stored in the determined storage location. In some instances the ETL execution application 132 may write new metadata or update metadata by executing a write metadata ETL operation 148, which is described below and may be combined with the output ETL operation 500 in an ETL process 122. In some implementations, the catalog program 134 may update the metadata 134 and/or catalog management information accordingly.

Figure 6:
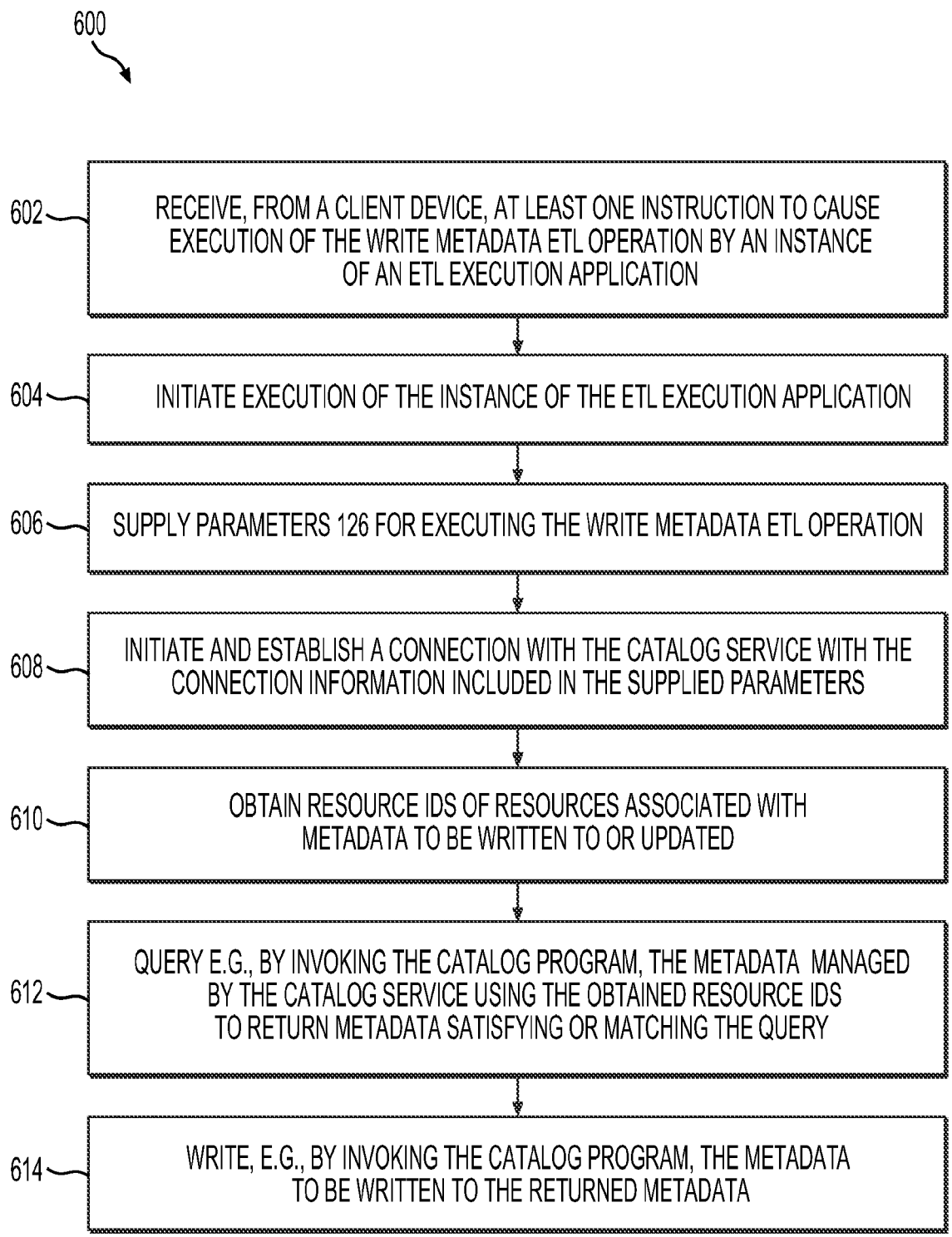
FIG. 6 is a flow diagram illustrating an example process for performing a write metadata ETL operation according to some implementations.

FIG. 6 is a flow diagram illustrating an example process for performing a write metadata ETL operation according to some implementations. For example, the write metadata ETL operation 600 may be executed at least in part by the one or more service computing device(s) 102 executing the ELT execution application 132, or the like.

At 602, the service computing device 102 may receive, from a client device 108, at least one instruction to cause execution of the write metadata ETL operation 148 by an instance of an ETL execution application 132.

At 604, the service computing device 102 may initiate execution of the instance of the ETL execution application.

At 606, the service computing device 012 may supply parameters 126 for executing the write metadata ETL operation 600. In some instances, the parameter program 124 may be invoked to supply one or more parameters 126 to the ETL execution application 132. In some instances, one or more parameters 126 may be supplied to the process logic of the ETL operation by the parameter program 124 or the ETL execution application 132 to be executed by the ETL execution application 132.

At 608, the service computing device 102 may initiate and establish a connection with the catalog service 120 with the connection information included in the supplied parameters. The process at 408 is similar to the process described above with respect to the process at 308 of the read metadata ETL operation 300. Therefore, the details of the process are not repeated here.

At 610, the service computing device 102 may obtain resource IDs of resources associated with metadata to be written to or updated. In some instances, the ETL execution application 132 may obtain the resource IDs from supplied parameters.

At 612, the service computing device may query e.g., by invoking the catalog program 134, the metadata 138 managed by the catalog service 123 using the obtained resource IDs to return metadata satisfying or matching the query. This process may be similar to 310 in a read metadata ETL operation 300 and so the details of the process are not repeated here.

At 614, the service computing device 102 may write, e.g., by invoking the catalog program 134, the metadata to be written to the returned metadata 168. The metadata to be written may be specified from preexisting metadata tags managed by the catalog service 120 or new metadata can be entered. Additionally, the metadata that is updated may be a location of the metadata based on a change in location of an associated data resource from an output ETL operation 146 or move data ETL operation 149, for example. In some implementations, the catalog program 134 may update the metadata 138 and/or the catalog management information 136 accordingly.

Figure 7:
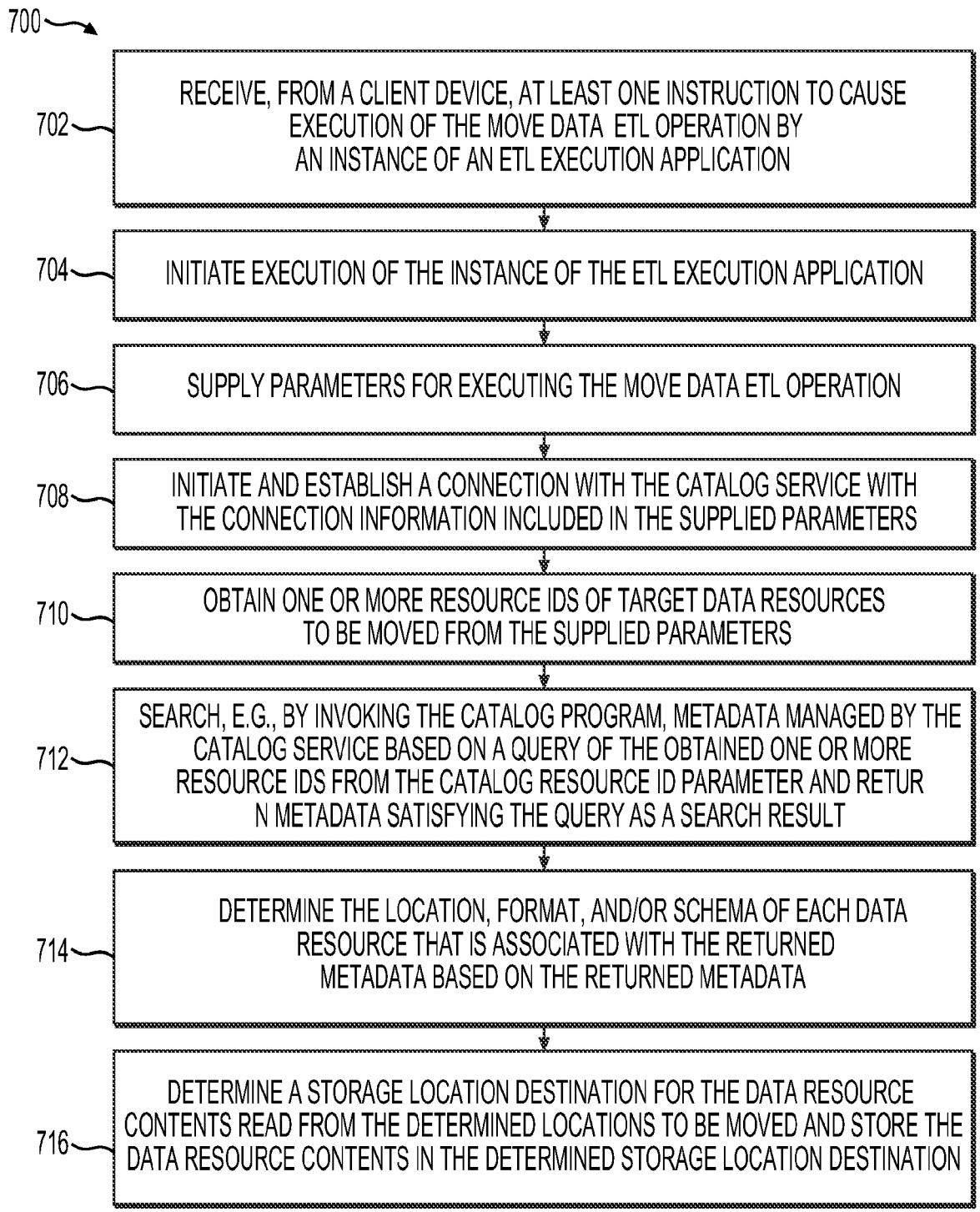
FIG. 7 is a flow diagram illustrating an example process for performing a move data ETL operation according to some implementations.

FIG. 7 is a flow diagram illustrating an example process for performing a move data ETL operation according to some implementations. For example, the move data ETL operation 700 may be executed at least in part by the one or more service computing device(s) 102 executing the ETL execution application 132, or the like.

At 702, the service computing device 102 may receive, from a client device 108, at least one instruction to cause execution of the move data ETL operation 149 by an instance of an ETL execution application 132.

At 704, the service computing device 102 may initiate execution of the instance of the ETL execution application.

At 706, the service computing device 012 may supply parameters 126 for executing the move data ETL operation 700. In some instances, the parameter program 124 may be invoked to supply one or more parameters 126 to the ETL execution application 132. In some instances, one or more parameters 126 may be supplied to the process logic of the ETL operation by the parameter program 124 or the ETL execution application 132 to be executed by the ETL execution application 132.

At 708, the service computing device 102 may initiate and establish a connection with the catalog service 120 with the connection information included in the supplied parameters. The process at 708 is similar to the process described above with respect to the process at 308 of the read metadata ETL operation 300. Therefore, the details of the process are not repeated here.

At 710, the service computing device 102 may obtain one or more resource IDs of target data resources to be moved from the supplied parameters. For example, the ETL execution application 132 may refer to the catalog resource ID 218 parameter, which may include, as the parameter value, one or more resource IDs of files or one or more resource IDs of a virtual folder managed by the catalog service 120.

At 712, the service computing device 102 may search, e.g., by invoking the catalog program 134, metadata 138 managed by the catalog service 120 based on a query of the obtained one or more resource IDs from the catalog resource ID 218 parameter and return metadata satisfying the query as a search result. The process at 712 is similar to the process described above with respect to the process at 310 of the read metadata ETL operation 300 and therefore the details of the process are not repeated here. In an example, if a virtual folder is identified as a target of a move, the catalog program 134 may return all metadata associated with the all data resources stored within the virtual folder and metadata of the virtual folder.

At 714, the service computing device 102 may determine the location, format, and/or schema of each data resource that is associated with the returned metadata based on the returned metadata. The process is similar to the process described above with respect to the process at 412 of the input ETL operation 400 and therefore the details of the process are not repeated here. Further, at 714, the service computing device 102 may, based on the location of each data resource determined from the returned metadata at 712, read the data resource contents of each data resource from the determined location of the data cluster(s) 103. This process is similar to the process described above with respect to the process at 414 and therefore the details of the process are not repeated here. Accordingly, for example, if the data resources associated with the returned metadata are CSV files, the data contents of the CSV files may be read or streamed row by row.

At 716, the service computing 102 device may determine a storage location destination for the data resource contents read from the determined locations to be moved and store the data resource contents in the determined storage location destination. For example, the ETL execution application 132 may refer to the catalog move target data source 224 parameter included in the supplied parameters to determine a destination virtual folder. In some implementations, the catalog move target data source may indicate a data cluster 103, data source 164, 168, 172, or virtual folder, for example. In instances where the catalog move target data source 224 parameter indicates a data cluster 103 or a data source 164, 168, 172, the destination virtual folder may be a default virtual folder. Accordingly, the determined storage location destination of each data resource to be written is a storage location of the destination virtual folder or storage location destination(s) mapped the (default) destination virtual folder. In some instances, the storage location(s) mapped or indexed in the virtual folder may be determined based on the metadata 138 of the default virtual folder or by referring to the catalog management information 136.

Further, the ETL execution application 132 may determine specifications and/or settings about the data resource contents of the data resources to be written by referring to the supplied parameters. For instance, the supplied parameters may include a catalog write name 228 and/or a catalog write file format 226 indicating a format of the file to be written. A parameter, such as a catalog overwrite resource 232 parameter may be included to inform the ETL execution application 132 whether to overwrite a (conflicting) data resource existing at the determined storage location. Additionally, in some instances, a parameter may be included that indicates whether to update an existing file and whether the file should be stored in a compressed state. Further, the ETL execution application may refer to catalog preserve folder structure 234 parameter type to determine whether to maintain a source virtual folder structure upon writing or moving a virtual folder and its contents to the determined storage location destination of a destination virtual folder. Accordingly, the ETL execution application 132 may write and store the contents of the data resource at the determined storage location according to the specifications and/or settings that are configured or specified in the supplied parameters.

At 718, the service computing device 102 may, e.g., by invoking the catalog program 134, update the catalog to reflect the changes based on the moved data resources. In some implementations, the catalog program 134 may update the catalog management information 136 accordingly.

At 720, the service computing device 102 may update e.g., by invoking the catalog program 134, the metadata 138 associated with the moved resources. For example, the computing device 102 may update, e.g., by invoking the catalog program 134, the metadata 138 associated with the moved data resources to change the location in the metadata 134 to the new location, which is the determined storage location destination. The service computing device 102 may execute the write metadata ETL operation to perform this process.

In some implementations, the parameters supplied at 306, 406, 506, 606 and 706 may include a parameter enable flag 206, which may have a value indicating true or false. At 306, 406, 506, 606 and 706, the ETL execution application 132 may evaluate the parameter enable flag 206 and if the parameter enable flag 206 is set to true, the ETL execution application 132 refers to the other supplied parameters to execute the respective ETL process 122. On the other hand, if the parameter enable flag 206 is set to false, the ETL execution application 132 does not execute the ETL process 120 according to the other supplied parameters. Rather, in some implementations, the ETL execution application 132 may resort to default parameters.

Additionally, in some implementations, an ETL process 122 executed by the ETL execution application 132 may include a combination of ETL operations, such as combining two or more of a read metadata ETL 142 operation, an input ETL operation 144, an output ETL operation 146 and a write metadata ETL operation 148. In such implementations when two or more ETL operations are combined, information such as parameters, metadata, and/or data resource contents may be shared or input from ETL operation to another. Further, in such implementations when two or more ETL operations are combined, at 306, 406, 506, 606 and 706, it may not be necessary for the parameters 126 to be supplied to the ETL execution application 132 again if the parameters were supplied to the ETL execution application to execute another ETL operation that is part of the ETL process being executed. Further, in such implementations when two or more ETL operations are combined at 308, 408, 508, 608 and 708, the catalog service 120 may already be connected and the connection is maintained. Therefore, in such implementations, communicating the connection information to connect to the catalog service 120 may not be necessary.

In some examples, the ETL execution application 132 may use the catalog API(s) 140 and/or local API(s) to execute the search, update metadata, register resources, and perform other functions as discussed above.

Further, the processes illustrated in FIGS. 3-7 is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
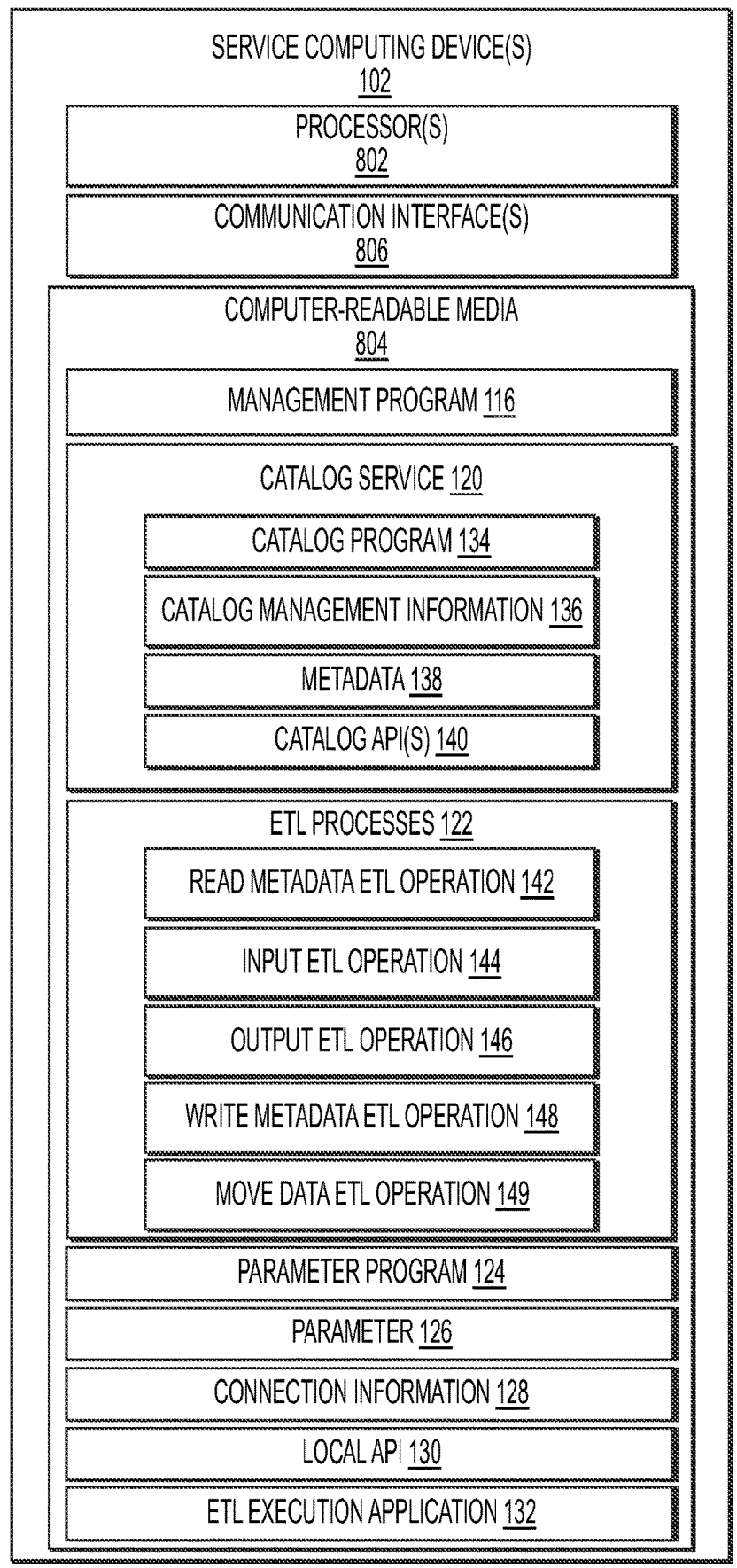
FIG. 8 illustrates select example components of the service computing device(s) that may be used to implement at least some of the functionality of the systems described herein.

FIG. 8 illustrates select example components of the service computing device(s) 102 that may be used to implement at least some of the functionality of the systems described herein. The service computing device(s) 102 may include one or more servers or other types of computing devices that may be embodied in any number of ways. For instance, in the case of a server, the programs, other functional components, and data may be implemented on a single server, multiple servers, a cluster of servers, a server farm or data center, a cloud-hosted computing service, and so forth, although other computer architectures may additionally or alternatively be used. Multiple service computing device(s) 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 802, one or more computer-readable media 804, and one or more communication interfaces 806. Each processor 802 may be a single processing unit or a number of processing units, and may include single or multiple computing units, or multiple processing cores. The processor(s) 802 can be implemented as one or more central processing units, microprocessors, microcomputers, microcontrollers, digital signal processors, state machines, logic circuitries, and/or any devices that manipulate signals based on operational instructions. As one example, the processor(s) 802 may include one or more hardware processors and/or logic circuits of any suitable type specifically programmed or configured to execute the algorithms and processes described herein. The processor(s) 802 may be configured to fetch and execute computer-readable instructions stored in the computer-readable media 804, which may program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. For example, the computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 804 may be a tangible non-transitory medium to the extent that, when mentioned, non-transitory computer-readable media exclude media such as energy, carrier signals, electromagnetic waves, and/or signals per se. In some cases, the computer-readable media 804 may be at the same location as the service computing device 102, while in other examples, the computer-readable media 804 may be partially remote from the service computing device 102.

The computer-readable media 804 may be used to store any number of functional components that are executable by the processor(s) 802. In many implementations, these functional components comprise instructions or programs that are executable by the processor(s) 802 and that, when executed, specifically program the processor(s) 802 to perform the actions attributed herein to the service computing device(s) 102. Functional components stored in the computer-readable media 804 may include the management program 116, the ETL execution application 132, catalog service 120, catalog program 134, ETL processes 122, read metadata ETL operation 142, input ETL operation 144, output ETL operation 1446, write metadata ETL operation 148, move data ETL operation 149, and parameter program 124, each of which may include one or more computer programs, applications, executable code, or portions thereof. Further, while these programs are illustrated together in this example, during use, some or all of these programs may be executed on separate service computing device(s) 102.

In addition, the computer-readable media 804 may store data, data structures, and other information used for performing the functions and services described herein. For example, the computer-readable media 804 may store the ETL process(es) 122, read metadata ETL operation 142, input ETL operation 144, output ETL operation 1446, write metadata ETL operation 148, move data ETL operation 149, the local API(s) 130, catalog management information 136, metadata 138, parameters 126, and connection information 128. Further, while these data and data structures are illustrated together in this example, during use, some or all of these data and/or data structures may be stored on separate service computing device(s) 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 806 may include one or more software and hardware components for enabling communication with various other devices, such as over the one or more network(s) 106. For example, the communication interface(s) 806 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In some examples herein, the data cluster computing devices 104 may have similar hardware configurations to those discussed above for the service computing device(s) 102, but with different functional components and data, such as indicated in FIG. 1. Further, the data cluster computing devices 104 may include many other logical, programmatic, and physical components, of which those described above are merely examples that are related to the discussion herein.

Various instructions, methods, and techniques described herein may be considered in the general context of computer-executable instructions, such as computer programs and applications stored on computer-readable media and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device comprising a processor configured to communicate over a network with a plurality of data cluster computing devices associated with a plurality of data clusters storing data resources, and configured to manage metadata associated with the stored data resources, the first computing device executing a single instance of an application to perform operations comprising:
obtaining parameters indicating first metadata, and second metadata in a respective data cluster;
searching the metadata using the first metadata as a search query and returning metadata as a first search result;
obtaining a first location of one or more data resources in a respective data cluster based on the returned metadata in the first search result;
reading contents of the one or more data resources from the first location of the respective data cluster;
searching the metadata using the second metadata as a search query and returning metadata as a second search result;
obtaining a second location in a respective data cluster based on the returned metadata in the second search result;
writing the read contents of the one or more data resources to the obtained second location based on the second search result;
wherein the first computing device is configured to execute a catalog service that manages the data resources, and metadata associated with each data resource, and resource identifiers identifying each data resource,
wherein the obtained parameters include a parameter indicating whether to maintain a folder structure,
wherein the data resources include a first virtual folder and a second virtual folder,
wherein the first metadata in the obtained parameters is a resource identifier of the first virtual folder,
wherein the second metadata in the obtained parameters is a name of the virtual folder, and
wherein the obtained second location is a file path of the second virtual folder determined based on the returned metadata in the second search result, the operations further comprising:
reading the contents of the one or more data resources from the first virtual folder at the first location of the respective data cluster;
determining whether the parameter indicating whether to maintain a folder structure indicates to maintain a folder structure;
upon determining the parameter indicating whether to maintain a folder structure indicates to maintain a folder structure, writing the read contents to the obtained second location of the second virtual folder according to a folder structure of the first folder; and
upon determining the parameter indicating whether to maintain a folder structure does not indicate to maintain a folder structure, writing the read contents to the obtained second location of the second virtual folder without maintaining the folder structure of the first folder.

2. The system as recited in claim 1, wherein the obtained parameters further include connection information parameters, which includes authentication information of a user to connect to the catalog service, the operations further comprising:
determining an authentication type based on the connection information parameters;
obtaining one or more parameter values of the connection information parameters based on the determined authentication type; and
connecting to the catalog service by sending the one or more parameter values of the connection information parameters based to the authentication type.

3. The system as recited in claim 1,
wherein the metadata associated with each data resource includes a resource identifier, and
wherein the parameters indicating first metadata and the second metadata are different resource identifiers.

4. The system as recited in claim 1, wherein the data resources are file data, the operations further comprising:
individually reading each row of file data from the respective data clusters; and
writing the contents of each individual row to the obtained location of destination based on the second search result.

5. The system as recited in claim 1, wherein the obtained parameters include a write format, a write name and an overwrite flag, and wherein the obtained second location is in a respective data cluster that is different than the respective data cluster of the first location of the one or more data resources, the operations further comprising:

writing the read contents of the one or more data resources to the obtained second location based on the name, write format and overwrite flag included in the parameters.

6. The system as recited in claim 1, the operations further comprising:
updating metadata indicating a location of the written data contents of the one or more data resources to the second location.

7. A method, executing a single instance of an application by a first computing device to perform operations comprising:
obtaining parameters indicating first metadata, and second metadata in a respective data cluster;
searching metadata using the first metadata as a search query and returning metadata as a first search result;
obtaining a first location of one or more data resources in a respective data cluster based on the returned metadata in the first search result;
reading contents of the one or more data resources from the first location of the respective data cluster;
searching the metadata using the second metadata as a search query and returning metadata as a second search result;
obtaining a second location in a respective data cluster based on the returned metadata in the second search result; and
writing the read contents of the one or more data resources to the obtained second location based on the second search result;
wherein the first computing device is configured to execute a catalog service that manages the data resources, and metadata associated with each data resource, and resource identifiers identifying each data resource,
wherein the obtained parameters include a parameter indicating whether to maintain a folder structure,
wherein the data resources include a first virtual folder and a second virtual folder,
wherein the first metadata in the obtained parameters is a resource identifier of the first virtual folder,
wherein the second metadata in the obtained parameters is a name of the virtual folder, and
wherein the obtained second location is a file path of the second virtual folder determined based on the returned metadata in the second search result, the operations further comprising:
reading the contents of the one or more data resources from the first virtual folder at the first location of the respective data cluster;
determining whether the parameter indicating whether to maintain a folder structure indicates to maintain a folder structure;
upon determining the parameter indicating whether to maintain a folder structure indicates to maintain a folder structure, writing the read contents to the obtained second location of the second virtual folder according to a folder structure of the first folder; and
upon determining the parameter indicating whether to maintain a folder structure does not indicate to maintain a folder structure, writing the read contents to the obtained second location of the second virtual folder without maintaining the folder structure of the first folder.

8. The method as recited in claim 7, wherein the obtained parameters further include connection information parameters, which include authentication information of a user to connect to the catalog service, the method further comprising:
determining an authentication type based on the connection information parameters;
obtaining one or more parameter values of the connection information parameters based on the determined authentication type; and
connecting to the catalog service by sending the one or more parameter values of the connection information parameters based to the authentication type.

9. The method as recited in claim 7,
wherein the metadata associated with each data resource includes a resource identifier, and
wherein the parameters indicating first metadata and the second metadata are different resource identifiers.

10. The method as recited in claim 7, wherein the data resources are file data, the method further comprising:
individually reading each row of file data from the respective data clusters; and
writing the contents of each individual row to the obtained location of destination based on the second search result.

11. The method as recited in claim 7, wherein the obtained parameters include a write format, a write name and an overwrite flag, wherein the obtained second location is in a respective data cluster that is different than the respective data cluster of the first location of the one or more data resources, the method further comprising:
writing the read contents of the one or more data resources to the obtained second location based on the name, write format and overwrite flag included in the parameters.

12. The method as recited in claim 7,
wherein at least one data resource is a virtual folder,
wherein the second metadata in the obtained parameters is a name of a virtual folder, and
wherein the obtained second location is a file path of the virtual folder determined based on the returned metadata in the second search result.

13. One or more non-transitory computer-readable media storing instructions that, when executed by one or more processors of a first computing device, configure the first computing device to perform operations comprising:
obtaining parameters indicating first metadata, and second metadata in a respective data cluster;
searching metadata using the first metadata as a search query and returning metadata as a first search result;
obtaining a first location of one or more data resources in a respective data cluster based on the returned metadata in the first search result;
reading contents of the one or more data resources from the first location of the respective data cluster;
searching the metadata using the second metadata as a search query and returning metadata as a second search result;
obtaining a second location in a respective data cluster based on the returned metadata in the second search result; and
writing the read contents of the one or more data resources to the obtained second location based on the second search result;
wherein the first computing device is configured to execute a catalog service that manages the data resources, and metadata associated with each data resource, and resource identifiers identifying each data resource, wherein the obtained parameters include a parameter indicating whether to maintain a folder structure, wherein the data resources include a first virtual folder and a second virtual folder, wherein the first metadata in the obtained parameters is a resource identifier of the first virtual folder, wherein the second metadata in the obtained parameters is a name of the virtual folder, and wherein the obtained second location is a file path of the second virtual folder determined based on the returned metadata in the second search result, the operations further comprising:

reading the contents of the one or more data resources from the first virtual folder at the first location of the respective data cluster;

determining whether the parameter indicating whether to maintain a folder structure indicates to maintain a folder structure;

upon determining the parameter indicating whether to maintain a folder structure indicates to maintain a folder structure, writing the read contents to the obtained second location of the second virtual folder according to a folder structure of the first folder; and upon determining the parameter indicating whether to maintain a folder structure does not indicate to maintain a folder structure, writing the read contents to the obtained second location of the second virtual folder without maintaining the folder structure of the first folder.

* * * * *